July 1, 1941.                    T. L. TITUS                    2,247,976
                          LIQUID DISPENSING VALVE
                           Filed Jan. 26, 1939                2 Sheets-Sheet 1
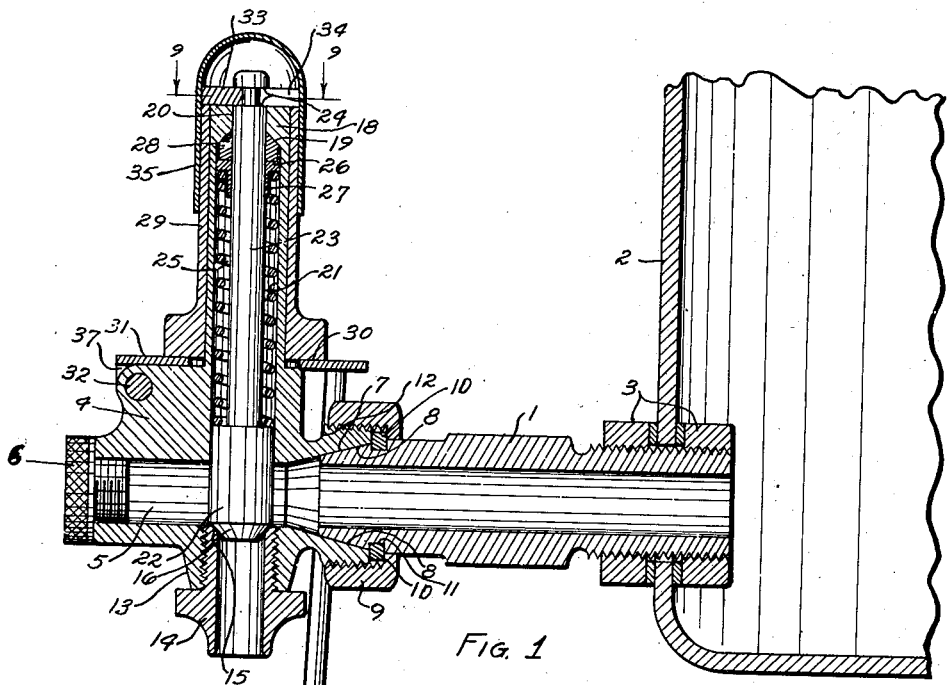
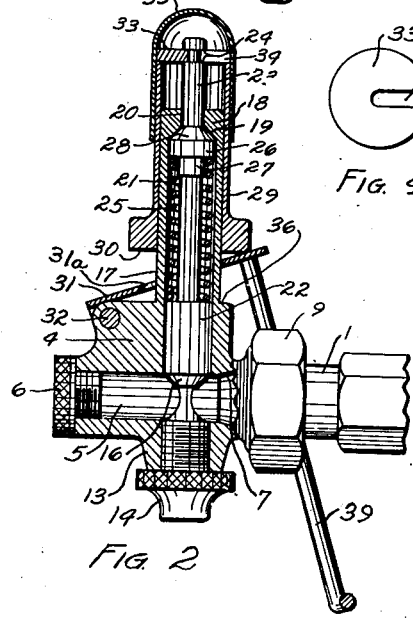
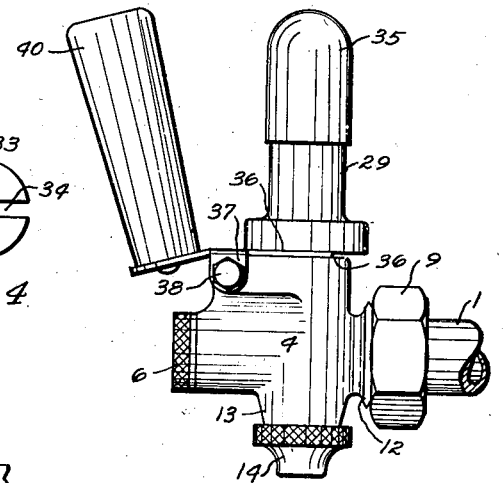
Inventor:
Thomas L. Titus
By Whitehead & Vogl
Per Earle Whitehead
Attorneys July 1, 1941.　　　T. L. TITUS　　　2,247,976
LIQUID DISPENSING VALVE
Filed Jan. 26, 1939　　　2 Sheets-Sheet 2

Inventor:
Thomas L. Titus
By Whitehead & Vogl
Per Earle Whitehead
Attorneys

Patented July 1, 1941

2,247,976

UNITED STATES PATENT OFFICE 2,247,976

LIQUID DISPENSING VALVE

Thomas L. Titus, Denver, Colo., assignor to The Wyott Manufacturing Company, Cheyenne, Wyo., a corporation of Wyoming Application January 26, 1939, Serial No. 252,891

12 Claims. (Cl. 251—134)

This invention relates to liquid dispensing valves.

The invention will be described in terms of its operation in dispensing coffee from a coffee urn into a cup, this being one of its intended extensive uses and one which clearly illustrates its construction and operation and its obvious capability of use in a large variety of structures and for a large variety of liquids.

Objects of the invention are to provide a valve structure of the class described which (a) shall be very compact (b) shall be positive in operation, (c) slows the initial flow of liquid on opening of the valve, (d) can be readily disassembled and opened up for easy cleaning (e) requires no adjusting but, when assembled, is and remains in proper adjustment and (f) is simple, economical and substantial in original construction as well as in operation, (g) embodies improved means for limiting the valve-opening movement and (h) has improved means for locking the valve structure.

With these and other objects in view, all of which will hereinafter more fully appear, the invention comprises certain novel constructions, combinations and arrangements of parts which will be hereinafter described and claimed and of which an illustrative embodiment is shown in the accompanying drawings, in which—

Fig. 1 is a vertical section of a fragment of a coffee urn and of a device constructed according to this invention attached to said urn, showing the valve closed.

Fig. 2 is a view like Fig. 1 but on a reduced scale, showing the valve open, showing certain parts in elevation, the fragment of the urn and a portion of the connecting and valve supporting structure being omitted.

Fig. 3 is a side elevation of the device shown in Figs. 1 and 2 but showing a handle for operating the valve instead of the cup operable lever shown in Figs. 1 and 2, with parts in valve-closed position.

Fig. 4 is a plan of the lock washer.

Figure 7:
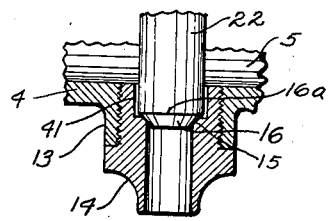
Fig. 7 is a sectional fragmentary view of the spout, valve seat and valve in closed position in modified form to slow the initial flow of liquid.

Pipe 1 mounted in the wall of urn 2 by any suitable means as collar 3 serves as a support for housing 4, which has a bore 5, normally closed at one end by knurled and threaded plug 6 and is flared at the opposite end as at 7 to form a liquid tight seat for tapered end 8 of pipe 1, the housing 4 being fastened to pipe 1 by connecting nut 9 engaging snap ring 10 seated in groove 11 in pipe 1, the nut 9 being threaded onto nipple 12 as clearly shown in the drawings.

Nipple 13 depending from housing 4 receives threaded spout 14 which is internally bevelled at its upper end to form seat 15 for conical valve 16. The parts are relatively so proportioned that when spout 14 is fully inserted into nipple 13 seat 15 will be at the desired predetermined point for the purpose hereinafter disclosed.

The bore of nipple 13 continues through housing 4 above bore 5 and upwardly through bonnet 17 to the plug 18 in the upper end of said bonnet, which plug may be integral with the bonnet as illustrated.

The plug 18 has a conical seat 19 and a central bore 20. The main vertical bore from bore 5 to plug 18 is indicated at 21 and within bore 21, the valve and certain associated parts are positioned and operate.

The portions of the valve structure which move in opening and closing the valve will now be described.

The valve assembly comprises the valve head 22 loosely slidable in bore 21, and having stem 23 slidable in bore 20 and having annular groove 24 for lock washer later described.

Surrounding stem 23 is compression spring 25 seated at its ends upon the top of head 22 and the bottom of cup 26 respectively. Spring 25 may be definitely positioned to avoid contact with both the stem 23 and the wall of bore 21 by having its lower end affixed in the appropriate position, to head 22 and by a pilot 27 depending from cup 26. The cup 26 carries a packing 28 of suitable material to fit into seat 19, it being understood that pilot 27, cup 26 and packing 28 are centrally bored to provide a sliding fit for stem 23.

Figure 6:
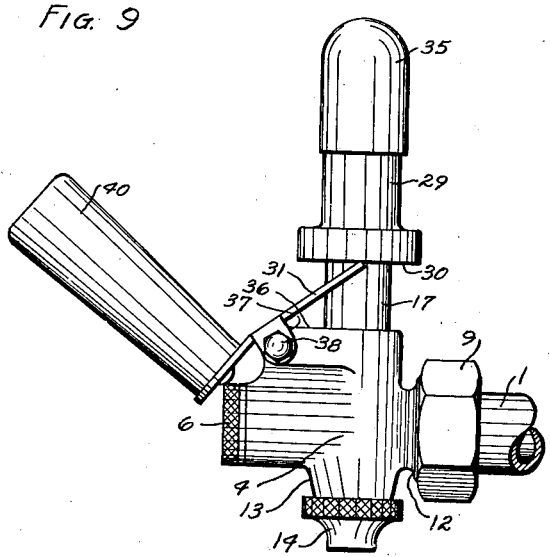
Fig. 6 is a view like Fig. 3 but showing parts in valve-open position.

Lifting sleeve 29, has a reciprocable sliding fit over bonnet 17 and is provided with a substantially broad base 30 which rests upon lifting plate 31 fulcrumed in housing 4 as at 32 and adapted to lift sleeve 29 when raised as illustrated at Figs. 2 and 6.

Lifting sleeve 29 is so proportioned that when plate 31 is at rest and sleeve 29 seated thereon the top of sleeve 29 will be at a suitable point, preferably coincident with top of plug 18 as illustrated, for contacting lock washer 33 to lift the valve as later described.

Lock washer 33, by means of notch 34 therein, engages stem 23 in the annular groove 24 so that when washer 33 is lifted, stem 23 will be lifted. Annular groove 24 must be sufficiently high on stem 23 so that when washer 33 is in engagement with groove 24 the seating of valve 16 on seat 15 will not be prevented by contact of washer 33 with the top of bonnet 17 or sleeve 29. Preferably the groove 24 is so positioned, as illustrated, that when washer 33 is engaged therein and the valve is closed, washer 33 will rest on the top of bonnet 17 and sleeve 29 as clearly shown at Fig. 1.

Dust cap 35 is preferably provided for protecting the above described parts and to retain washer 33 in position.

Housing 4 is preferably flattened on top as at 36 to provide a seat for lifting plate 31 which has elongated opening 31a which permits plate 31 to surround bonnet 17 and to be tipped relative to bonnet 17. When the plate 31 is tipped upon its fulcrum, sleeve 29 is raised which lifts washer 33 which, in turn, lifts valve stem 23 and opens the valve, compressing spring 25 and permitting liquid to flow from bore 5 down through and out of spout 14.

Plate 31 is conveniently fulcrumed in the housing 4 by providing fulcrum pin 32 slidable through housing 4 and through depending ears 37, retaining nuts 38 being threaded on the ends of pin 32.

The plate 31 may be tipped by a depending lever 39, operable by pressure of a cup thereagainst or by a handle 40. No stop is required for the cup lever 39 because the operator will naturally hold the cup beneath the spout 14 and a cup held in this position will displace lever 39 just far enough to open the valve the desired amount.

The handle 40 is so angled relative to plate 31 that it will contact plug 6 when the valve is opened to the desired extent as illustrated at Fig. 6. Plug 6 acts as a stop.

It will be understood that spring 25 and the pressure of the liquid join in holding packing 20 in liquid tight contact with seat 19 and, because of the inclination of the seat, with stem 23.

Figure 8:
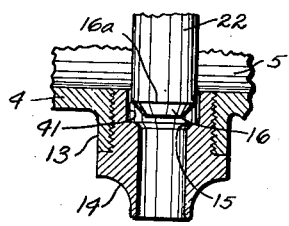
Fig. 8 is the same as Fig. 7 except that valve is shown partly open.
Figure 9:
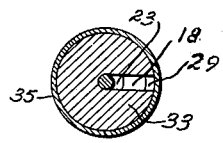
Fig. 9 is a section on line 9—9 of Fig. 1.
Figure 5:
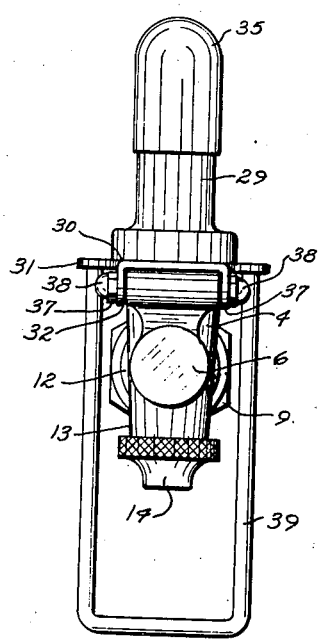
Fig. 5 is a front elevation of the device with the cup operated lever as shown in Figs. 1 and 2.

The modification illustrated at Figs. 7 and 8 is desirable especially where the liquid is under a considerable head as in case of a high urn when substantially full. In such case the sudden opening of the valve is apt to shoot a stream into the cup with such force that it will slop over.

To obviate this objectionable result the bore in the upper part of spout 14 may be enlarged as at 41 and valve seat 15 is formed at the bottom of the enlarged portion of the bore so that valve head 22 projects within enlarged bore 41, a clearance being provided between the head 22 and bore 41 so that when valve 16 is lifted off seat 15 a limited amount of liquid will flow down around head 22 within bore 41 and down and out of the spout. These parts are proportioned to allow passage, around head 22 within bore 41, of an amount of liquid insufficient to fill spout 14 so that such liquid will drop from the spout simply by gravity. The parts are further so proportioned that by the time the upper edge 16a of valve 16 passes the upper edge of bore 41 and fully opens the valve for passage of liquid under pressure, there will have been deposited in the cup a small amount of liquid which will tend to prevent the splashing of the liquid, which is thereafter injected into the cup under pressure.

The entire structure may be readily disassembled, easily cleaned and reassembled, all by any person of the class ordinarily employed where coffee urns and the like are used. When disassembled, every part is easy of access for cleaning.

The lock-washer arrangement has a particular use in addition to the part it plays in the ease of assembling and disassembling the structure. Where several urns are in operation it is frequently desired to lock one or more of them until the contents of the unlocked urns is exhausted so that the making of a new supply of coffee may start in an empty urn while another urn still contains a substantial quantity, thus alternating the urns in use.

To lock this valve structure it is necessary only to remove dust cap 35 and lock washer 33, placing the washer in a receptacle convenient to the urn and replacing the dust cap for appearance sake. When an unlocked urn is empty the dust cap on the locked urn is removed, the lock washer is placed in position as shown in Fig. 1, the dust cap is replaced and the urn is unlocked and ready for use.

While I have illustrated and described many details of construction I desire not to be confined to such details because many variations and modifications and equivalents thereof will be obvious to those skilled in the art, within the spirit and scope of this invention, the foregoing specification and the appended claims.

I claim:

1. In a valve structure having a housing and a valve therein and a valve-stem-bonnet projecting from the housing and a valve stem reciprocable within and projecting beyond the end of the bonnet, a lifting sleeve reciprocable on the bonnet, a member engaging the stem beyond the end of the bonnet and lying partially in the path of movement of said lifting sleeve and means for actuating said lifting sleeve against said stem-engaging member whereby to lift the valve stem.

2. In the structure as defined in claim 1, the stem engaging member having a slidable engagement with the stem and extending beyond the sides of the bonnet and into the path of reciprocation of the lifting sleeve.

3. In the structure as defined in claim 1, the lifting sleeve encircling the bonnet between the stem engaging member and the actuating means.

4. In a structure as defined in claim 1, the stem having a transverse groove normally adjacent the outer end of the casing and the stem engaging member being disk-like and having a notch adapted to engage said groove, said disk-like member, when thus engaged with the stem, being adapted to project beyond the sides of the casing into the path of reciprocation of the lifting sleeve.

5. In a structure as defined in claim 1, a cylindrical cap frictionally engaging the periphery of, and carried by, said sleeve.

6. In a valve structure having a housed valve, a bonnet and a valve stem reciprocable within and through the end of the bonnet, a stem lifting member reciprocably sleeved on the bonnet, a separate and manually removable member engaging the stem adjacent the end of the bonnet when the valve is closed, said member lying partially in the path of movement of said lifting member and means for reciprocating said lifting member on the bonnet and against said stem engaging member whereby to lift the valve stem.

7. In a valve structure as defined in claim 6, the stem engaging member having a slidable interengagement with the stem.

8. In a valve structure having a housed valve, a bonnet and a valve stem reciprocable within, and through the end of, the bonnet, a stem lifting member reciprocably sleeved on the bonnet, a separate and manually removable member engaging the stem adjacent the end of the bonnet when the valve is closed, said member extending beyond the sides of the bonnet and into the path of movement of said lifting member and means for reciprocating said lifting member on the bonnet and against said stem engaging member whereby to lift the valve stem.

9. In a valve structure as defined in claim 8, in which the engaging member does not extend beyond the path of movement of the lifting member.

10. In a valve structure having a housed valve, a bonnet and a valve stem reciprocable within, and through the end of, the bonnet, a stem lifting member reciprocably sleeved on the bonnet, a separate and manually removable member engaging the stem adjacent the end of the bonnet when the valve is closed, said member lying partially in the path of movement of said lifting member and means for reciprocating said lifting member on the bonnet and against said stem engaging member whereby to lift the valve stem and a cap enclosing the end of the stem and the stem engaging member and frictionally engaging, and carried by, the lifting member.

11. In a valve structure having a bonnet and a valve stem reciprocable through the end of the bonnet, a stem lifting sleeve reciprocable on the bonnet, a member having transversely slidable interengagement with the stem, said member when engaged with the stem projecting beyond the walls of the bonnet and adapted to be engaged by the lifting sleeve when the sleeve is reciprocated.

12. In a valve structure as defined in claim 11, a cap frictionally engaging and carried by the lifting sleeve and enclosing the end of the stem and said member.

THOMAS L. TITUS.